United States Patent
Dolby et al.

(10) Patent No.: US 12,124,822 B2
(45) Date of Patent: Oct. 22, 2024

(54) MINING CODE EXPRESSIONS FOR DATA ANALYSIS

(71) Applicant: International Business Machines Corporation, Armonk, NY (US)

(72) Inventors: Julian Timothy Dolby, Bronx, NY (US); Horst Cornelius Samulowitz, Armonk, NY (US); Kavitha Srinivas, Port Chester, NY (US)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 17/895,881

(22) Filed: Aug. 25, 2022

(65) Prior Publication Data

US 2024/0069873 A1 Feb. 29, 2024

(51) Int. Cl.
*G06F 8/75* (2018.01)
*G06F 8/35* (2018.01)
(Continued)

(52) U.S. Cl.
CPC ............... *G06F 8/35* (2013.01); *G06F 8/75* (2013.01); *G06F 11/3604* (2013.01);
(Continued)

(58) Field of Classification Search
CPC .......... G06F 8/35; G06F 8/75; G06F 11/3604; G06F 21/562; G06F 21/563; H04L 63/1433
See application file for complete search history.

(56) References Cited

U.S. PATENT DOCUMENTS

| 6,263,339 B1 | 7/2001 | Hirsch |
| 6,741,974 B1 | 5/2004 | Harrison et al. |

(Continued)

FOREIGN PATENT DOCUMENTS

| CN | 108334321 A | 7/2018 |
| CN | 110134848 A | 8/2019 |

(Continued)

OTHER PUBLICATIONS

Anwar Alqaimi et al., Automatically Generating Documentation for Lambda Expressions in Java, 2019 IEEE, [Retrieved on Apr. 23, 2024]. Retrieved from the internet: <URL: https://ieeexplore.ieee.org/stamp/stamp.jsp?tp=&arnumber=8816799> 11 Pages (310-320) (Year: 2019).*

(Continued)

*Primary Examiner* — Anibal Rivera
(74) *Attorney, Agent, or Firm* — Patterson + Sheridan, LLP

(57) ABSTRACT

Techniques for computer software code analysis are disclosed. One or more data flows are generated, based on analyzing software code using static analysis. A data object is identified in the software code using the one or more data flows, the data object relating to a structured dataset. A correspondence between a code expression in the software code and a characteristic of the structured dataset is identified, based on analyzing one or more reads from and one or more writes to the data object using the one or more data flows. The code expression for the structured dataset is analyzed, based on the correspondence, including at least one of: (i) generating a software code recommendation engine based on the code expression and the structured dataset, or (ii) generating one or more lambda expressions for application to the structured dataset, based on the code expression.

17 Claims, 9 Drawing Sheets

(51) Int. Cl.
  G06F 8/41      (2018.01)
  G06F 8/51      (2018.01)
  G06F 11/36     (2006.01)
  G06F 21/56     (2013.01)
  H04L 9/40      (2022.01)
(52) U.S. Cl.
  CPC .......... G06F 21/562 (2013.01); G06F 21/563 (2013.01); H04L 63/1433 (2013.01)

(56) References Cited

U.S. PATENT DOCUMENTS

| | | | |
|---|---|---|---|
| 6,965,902 | B1 | 11/2005 | Ghatate |
| 7,530,054 | B2 | 5/2009 | Reimer et al. |
| 7,703,085 | B2 | 4/2010 | Poznanovic et al. |
| 7,984,422 | B2 | 7/2011 | Graham |
| 8,843,884 | B1 | 9/2014 | Koerner |
| 9,639,335 | B2 | 5/2017 | Hoban et al. |
| 9,658,839 | B2 | 5/2017 | Hale et al. |
| 9,959,326 | B2 | 5/2018 | Duan et al. |
| 10,073,763 | B1 | 9/2018 | Raman et al. |
| 10,229,200 | B2 | 3/2019 | Bornea et al. |
| 10,303,448 | B2 | 5/2019 | Steven et al. |
| 10,402,175 | B2 | 9/2019 | McFarland |
| 10,606,885 | B2 | 3/2020 | Brundage et al. |
| 11,003,994 | B2 | 5/2021 | Liang et al. |
| 2002/0062463 | A1* | 5/2002 | Hines ............ G06F 9/4488 714/E11.21 |
| 2006/0294499 | A1 | 12/2006 | Shim |
| 2010/0175049 | A1 | 7/2010 | Ramsey et al. |
| 2010/0287214 | A1* | 11/2010 | Narasayya ........... G06F 16/217 707/759 |
| 2011/0202559 | A1 | 8/2011 | Stiers |
| 2013/0086547 | A1 | 4/2013 | Said et al. |
| 2016/0315960 | A1* | 10/2016 | Teilhet ............. G06F 21/55 |
| 2017/0109933 | A1 | 4/2017 | Voorhees et al. |
| 2017/0221153 | A1 | 8/2017 | Allbright |
| 2017/0255536 | A1 | 9/2017 | Weissinger et al. |
| 2019/0005163 | A1 | 1/2019 | Farrell et al. |
| 2020/0110746 | A1 | 4/2020 | Lecue et al. |
| 2020/0143243 | A1 | 5/2020 | Liang et al. |
| 2020/0175163 | A1* | 6/2020 | Hassanshahi ........... G06F 21/54 |
| 2020/0210478 | A1 | 7/2020 | Wada et al. |
| 2020/0233889 | A1 | 7/2020 | Nassar |
| 2021/0173641 | A1 | 6/2021 | Dolby et al. |
| 2021/0326312 | A1 | 10/2021 | White |
| 2021/0342723 | A1 | 11/2021 | Rao |

FOREIGN PATENT DOCUMENTS

| | | |
|---|---|---|
| CN | 110362596 A | 10/2019 |
| CN | 111091883 A | 5/2020 |
| CN | 111353005 A | 6/2020 |
| CN | 112287679 A | 1/2021 |
| KR | 101505546 B1 | 3/2015 |
| KR | 101762670 B1 | 8/2017 |

OTHER PUBLICATIONS

Karim Ali et al., A Study of Call Graph Construction for JVM-Hosted Languages, Dec. 2021 IEEE, [Retrieved on Apr. 23, 2024]. Retrieved from the internet: <URL: https://ieeexplore.ieee.org/stamp/stamp.jsp?tp=&arnumber=8944149> 23 Pages (2644-2666) (Year: 2021).*

José Pablo Cambronero et al., "wranglesearch: Mining Data: Wrangling Functions from Python Programs [Under submission]," pp. 1-9.

Mohammad Hossein Namaki et al., "Vamsa: Automated Provenance Tracking in Data Science Scripts," Research Track Paper, dated Aug. 23-27, 2020, Virtual Event, USA, pp. 1-10.

Cong Yan et al., "Synthesizing Type-Detection Logic for Rich Semantic Data Types using Open-source Code," SIGMOD'18, Dated Jun. 10-15, 2018, pp. 1-16.

"List of IBM Patents or Patent Applications Treated As Related," for U.S. Appl. No. 17/895,881, as filed on Aug. 25, 2022.

M. Allamanis, E. T. Barr, P. Devanbu, and C. Sutton, "A survey of machine learning for big code and naturalness," ACM Comput. Surv., vol. 51, No. 4, pp. 81:1-81:37, Jul. 2018. [Online]. Available: http://doi.acm.org/10.1145/3212695.

Z. Li, D. Zou, S. Xu, H. Jin, Y. Zhu, Z. Chen, S. Wang, and J. Wang, "Sysevr: A framework for using deep learning to detect software vulnerabilities," CoRR, vol. abs/1807.06756, 2018. [Online]. Available:http://arxiv.org/abs/1807.06756.

U. Alon, M. Zilberstein, O. Levy, and E. Yahav, "A general pathbased representation for predicting program properties," CoRR, vol. abs/1803.09544, 2018. [Online]. Available: http://arxiv.org/abs/1803.09544.

Hu, et al. "Codesum: Translate program language to natural language," CoRR, vol. abs/1708.01837, 2017, withdrawn. [Online]. Available: http://arxiv.org/abs/1708.01837.

M. White, M. Tufano, C. Vendome, and D. Poshyvanyk, "Deep learning code fragments for code clone detection," in Proceedings of the 31st IEEE/ACM International Conference on Automated Software Engineering, ser. ASE 2016. New York, NY, USA: ACM, 2016, pp. 87-98. [Online]. Available: http://doi.acm.org/10.1145/2970276.2970326.

M. Allamanis, M. Brockschmidt, and M. Khademi, "Learning to represent programs with graphs," CoRR, vol. abs/1711.00740, 2017. [Online]. Available: http://arxiv.org/abs/1711.00740.

B. Bichsel, V. Raychev, P. Tsankov, and M. Vechev, "Statistical deobfuscation of android applications," in Proceedings of the 2016 ACM SIGSAC Conference on Computer and Communications Security, ser. CCS '16. New York, NY, USA: ACM, 2016, pp. 343-355. [Online]. Available: http://doi.acm.org/10.1145/2976749.2978422.

U. Alon, O. Levy, and E. Yahav, "code2seq: Generating sequences from structured representations of code," CoRR, vol. abs/1808.01400, 2018. [Online]. Available: http://arxiv.org/abs/1808.01400.

O. Agesen, J. Palsberg, and M. I. Schwartzbach, "Type inference of self: Analysis of objects with dynamic and multiple inheritance," Softw., Pract. Exper., vol. 25, pp. 975-995, 1995.

C. Chambers and D. Ungar, "Iterative type analysis and extended message splitting; optimizing dynamically-typed object-oriented programs," in ACM SIGPLAN Notices, vol. 25, No. 6. ACM, 1990, pp. 150-164.

O. Shivers, "Control-flow analysis of higher-order languages : or taming lambda /," 01 1991.

A. Feldthaus, M. Schafer, M. Sridharan, J. Dolby, and F. Tip, "Efficient construction of approximate call graphs for javascript IDE services," in 35th International Conference on Software Engineering, ICSE '13, San Francisco, CA, USA, May 18-26, 2013, 2013, pp. 752-761. [Online].Available: https://doi.org/10.1109/ICSE.2013.6606621.

C. Hsiao, M. J. Cafarella, and S. Narayanasamy, "Reducing mapreduce abstraction costs for text-centric applications," in 43rd International Conference on Parallel Processing, ICPP 2014, Minneapolis, MN, USA, Sep. 9-12, 2014, 2014, pp. 40-49. [Online]. Available: https://doi.org/10.1109/ICPP.2014.13.

P. Fernandes, M. Allamanis, and M. Brockschmidt, "Structured neural summarization," CoRR, vol. abs/1811.01824, 2018.

K. Chae, H. Oh, K. Heo, and H. Yang, "Automatically generating features for learning program analysis heuristics for c-like languages," Proc. ACM Program. Lang., vol. 1, No. OOPSLA, pp. 101:1-101:25,Oct. 2017. [Online]. Available: http://doi.acm.org/10.1145/3133925.

M. Bruch, M. Monperrus, and M. Mezini, "Learning from examples to improve code completion systems," in Proceedings of the the 7th Joint Meeting of the European Software Engineering Conference and the ACM SIGSOFT Symposium on The Foundations of Software Engineering,ser. ESEC/FSE '09. New York, NY, USA: ACM 2009, pp. 213-222. [Online]. Available: http://doi.acm.org/10.1145/1595696.1595728.

S. Proksch, J. Lerch, and M. Mezini, "Intelligent code completion with bayesian networks," ACM Trans. Softw. Eng. Methodol., vol. 25, No. 1, pp. 3:1-3:31, Dec. 2015. [Online]. Available: http://doi.acm.org/10.1145/2744200.

(56) References Cited

OTHER PUBLICATIONS

A. T. Nguyen and T. N. Nguyen, "Graph-based statistical language model for code," in Proceedings of the 37th International Conference on Software Engineering—vol. 1, ser. ICSE '15. Piscataway, NJ, USA: IEEE Press, 2015, pp. 858-868. [Online]. Available:http://dl.acm.org/citation.cfm?id=2818754.2818858.

T. T. Nguyen, H. A. Nguyen, N. H. Pham, J. M. Al-Kofahi, and T. N.Nguyen, "Graph-based mining of multiple object usage patterns," in Proceedings of the the 7th Joint Meeting of the European Software Engineering Conference and the ACM SIGSOFT Symposium on The Foundations of Software Engineering, ser. ESEC/FSE '09. New York, NY, USA: ACM, 2009, pp. 383-392. [Online]. Available:http://doi.acm.org/10.1145/1595696.1595767.

M. Feurer, A. Klein, K. Eggensperger, J. T. Springenberg, M. Blum, and F. Hutter, "Efficient and robust automated machine learning," in Proceedings of the 28th International Conference on Neural Information Processing Systems—vol. 2, ser. NIPS115. Cambridge, MA, USA: MIT Press, 2015, pp. 2755-2763. [Online]. Available: http://dl.acm.org/citation.cfm?id=2969442.2969547.

R. S. Olson, N. Bartley, R. J. Urbanowicz, and J. H. Moore, "Evaluation of a tree-based pipeline optimization tool for automating data science," in Proceedings of the Genetic and Evolutionary Computation Conference 2016, ser. GECCO '16. New York, NY, USA: ACM, 2016, pp. 485-492. [Online]. Available: http://doi.acm.org/10.1145/2908812.2908918.

M. Feurer, J. T. Springenberg, and F. Hutter, "Using meta-learning to initialize bayesian optimization of hyperparameters," in Proceedings of the 2014 International Conference on Meta-learning and Algorithm Selection—vol. 1201, ser. MLAS'14. Aachen, Germany, Germany: CEUR-WS.org, 2014, pp. 3-10. [Online]. Available: http://dl.acm.org/citation.cfm?id=3015544.3015549.

Yu et al., "Deep Code Curator—Technical Report on Code2Graph", Apr. 2019, CECS Technical Report, University of California, Irvine, 33 pages. (Year: 2019).

Andreea Grigoriu et al., "SIENA: Semi-automatic semantic enhancement of datasets using concept recognition," Journal of Biomedical Semantics, Year: 2021, pp. 1-12.

Huynh et al. "DAGOBAH: Enhanced Scoring Algorithms for Scalable Annotations of Tabular Data." SemTab@ ISWC, Year: 2020, pp. 1-13.

Khurana et al., "Semantic Annotation for Tabular Data." Dated: Dec. 15, 2020, pp. 1-9.

Mell et al., "The NIST Definition of Cloud Computing: Computer Security," NIST National Institute of Standards and Technology, Date: Sep. 2011, pp. 1-7.

Suhara et al., "Annotating cols. with Pre-Trained Language Models," Dated Mar. 1, 2022, pp. 1-15.

Cremaschi, et al., "MantisTable: an Automatic Approach for the Semantic Table Interpretation", Conference: SemTab 2019: Semantic Web Challenge on Tabular Data to Knowledge Graph Matching co-located with the 18th International Semantic Web Conference, Oct. 2019, 10 pgs.

"H20 AI Feature Store", Downloaded from the Internet on Oct. 26, 2022, 5 pgs., <https://h2o.ai/platform/ai-cloud/make/feature-store/>.

Khurana, et al., "Feature Engineering for Predictive Modeling Using Reinforcement Learning", The Thirty-Second AAAI Conference on Artificial Intelligence (AAAI-18), Sep. 21, 2017, 8 pgs.

Galhotra, et al., "Semantic Search over Structured Data", CIKM '20: Proceedings of the 29th ACM International Conference on Information & Knowledge Management, Oct. 2020, 4 pgs., <https://doi.org/10.1145/3340531.3417426>.

Neumaier, et al., "Multi-level semantic labelling of numerical values", The Semantic Web—ISWC 2016. ISWC 2016. Lecture Notes in Computer Science, vol. 9981. Springer, Cham., 16 pgs. < https://doi. org/10.1007/978-3-319-46523-4_26>.

Ota, et al., "Data Driven Domain Discovery for Structured Datasets", Proceedings of the VLDB Endowment, vol. 13, No. 7, Sep. 2020, 13 pgs.

Srinivas, et al., "Semantic Feature Discovery with Code Mining and Semantic Type Detection", Jun. 28, 2022, 3 pgs.

Oliveira, et al., "ADOG-Annotating Data with Ontologies and Graphs", In Sem Tab@ ISWC, 2019, 6 pgs.

Nguyen, et al., "MTab: Matching Tabular Data to Knowledge Graph using Probability Models", arXiv:1910.00246v1 [cs.AI], Oct. 1, 2019, 8 pgs.

Morikawa, H., "Semantic Table Interpretation using LOD4ALL", SemTab@ ISWC, 2019, 8 pgs.

Jimenez-Ruiz, et al.,"SemTab2019: Resources to Benchmark Tabular Data to Knowledge Graph Matching Systems;"European Semantic Web Conference, Springer 2020, 41 pgs.

Galhotra, et al., "Automated Feature Enhancement for Predictive Modeling using External Knowledge",2019 International Conference on Data Mining Workshops (ICDMW), Nov. 8-11, 2019, 4 pgs., doi: 10.1109/ICDMW.2019.00161.

Ritze, et al., "Matching HTML tables to DBpedia", Proceedings of the 5th International Conference on Web Intelligence, Mining and Semantics, Article 10, Jul. 2015, 6 pgs.

Limaye, et al., "Annotating and searching web tables using entities, types and relationships", 36th International Conference on Very Large Data Bases, Sep. 13-17, 2010, Proceedings of the VLDB Endowment, vol. 3, No. 1, Singapore 10 pgs.

Zhang, et al., "Sato: Contextual Semantic Type Detection in Tables", Proceedings of the VLDB Endowment, vol. 13, No. 11, 2020, DOI: https://doi.org/10.14778/3407790.3407793, 14 pgs.

Hulsebos, et al., "Sherlock: A Deep Learning Approach to Semantic Data Type Detection", KDD '19, Aug. 4-8, 2019, Anchorage, AK, USA, 9 pgs.

Chen, et al., "Learning Semantic Annotations for Tabular Data", Proceedings of the Twenty-Eighth International Joint Conference on Artificial Intelligence (IJCAI-19) May 30, 2019, 7 pgs.

Chen, et al., "Colnet: Embedding the Semantics of Web Tables for col. Type Prediction", The Thirty-Third AAAI Conference on Artificial Intelligence (AAAI-19), Nov. 4, 2018, 8 pages.

Kanter et al., "Deep feature synthesis: Towards automating data science endeavors." 2015 IEEE international conference on data science and advanced analytics (Dsaa). IEEE, 2015; 10 pages.

Katz et al., "Explorekit: Automatic feature generation and selection." 2016 IEEE 16th International Conference on Data Mining (ICDM). IEEE, 2016; 6 pages.

Song; Autofe: efficient and robust automated feature engineering; Massachusetts Institute of Technology, 2018; 61 pages.

* cited by examiner

MINING CODE EXPRESSIONS FOR DATA ANALYSIS

BACKGROUND

The present invention relates to computer software code analysis, and more specifically, to analyzing code expressions for data analysis.

SUMMARY

Embodiments include a computer-implemented method. The method includes generating one or more data flows based on analyzing software code using static analysis. The method further includes identifying a data object in the software code using the one or more data flows, the data object relating to a structured dataset. The method further includes determining a correspondence between a code expression in the software code and a characteristic of the structured dataset, based on analyzing one or more reads from and one or more writes to the data object using the one or more data flows. The method further includes analyzing the code expression for the structured dataset, based on the correspondence, including at least one of: (i) generating a software code recommendation engine based on the code expression and the structured dataset, or (ii) generating one or more lambda expressions for application to the structured dataset, based on the code expression.

Embodiments further include a system, including a processor and a memory having instructions stored thereon which, when executed on the processor, performs operations. The operations include generating one or more data flows based on analyzing software code using static analysis. The operations further include identifying a data object in the software code using the one or more data flows, the data object relating to a structured dataset. The operations further include determining a correspondence between a code expression in the software code and a characteristic of the structured dataset, based on analyzing one or more reads from and one or more writes to the data object using the one or more data flows. The operations further include analyzing the code expression for the structured dataset, based on the correspondence, including at least one of: (i) generating a software code recommendation engine based on the code expression and the structured dataset, or (ii) generating one or more lambda expressions for application to the structured dataset, based on the code expression.

Embodiments further include a computer program product, including a computer-readable storage medium having computer-readable program code embodied therewith, the computer-readable program code executable by one or more computer processors to perform operations. The operations include generating one or more data flows based on analyzing software code using static analysis. The operations further include identifying a data object in the software code using the one or more data flows, the data object relating to a structured dataset. The operations further include determining a correspondence between a code expression in the software code and a characteristic of the structured dataset, based on analyzing one or more reads from and one or more writes to the data object using the one or more data flows. The operations further include analyzing the code expression for the structured dataset, based on the correspondence, including at least one of: (i) generating a software code recommendation engine based on the code expression and the structured dataset, or (ii) generating one or more lambda expressions for application to the structured dataset, based on the code expression.

DETAILED DESCRIPTION

Figure 1:
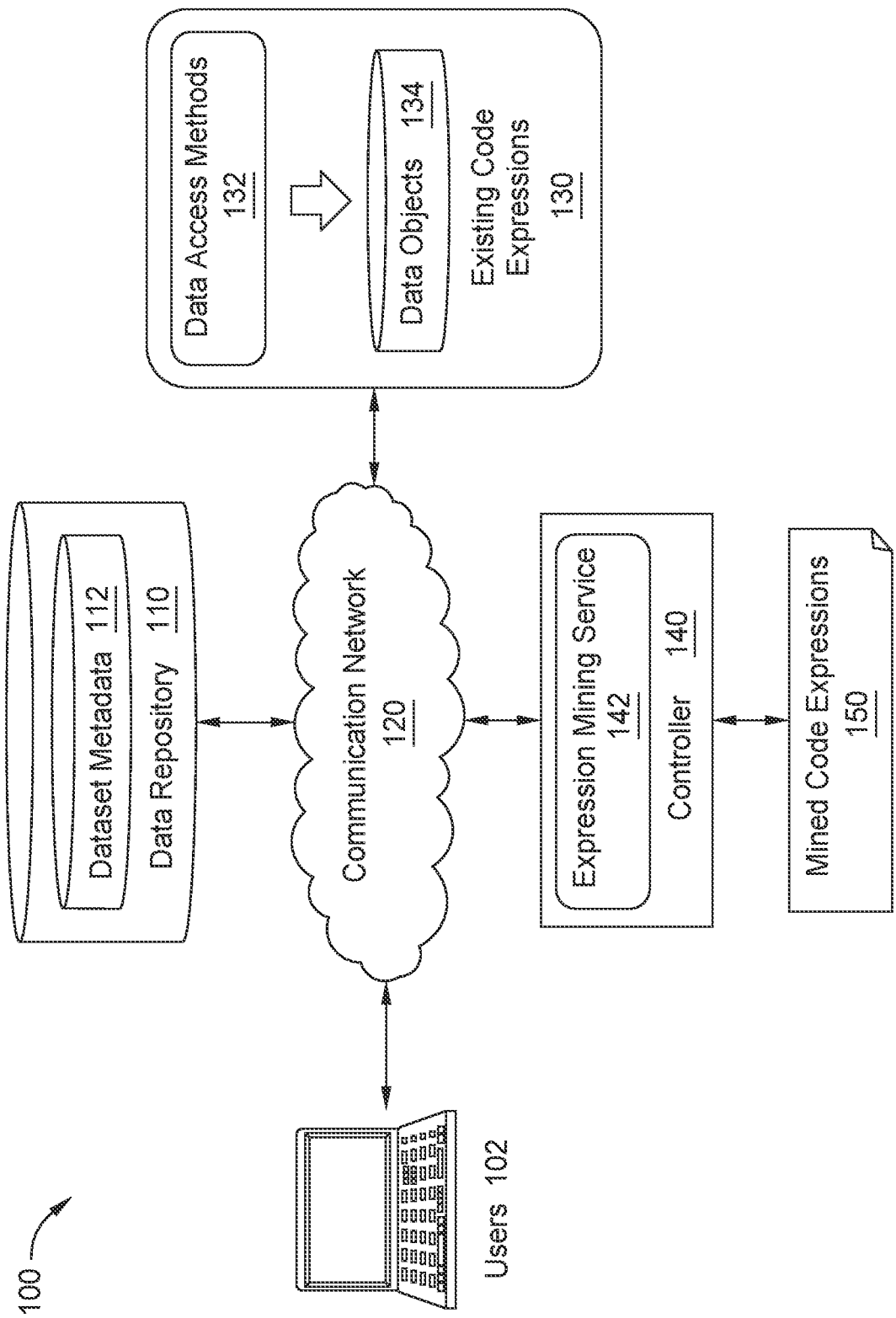
FIG. 1 illustrates a computing environment for mining code expressions for data analysis, according to one embodiment.

Structured data often includes labels for various aspects of the data. For example, comma-separated-value (CSV) files and javascript object notation (JSON) data structures frequently include names for attributes and columns. But to accessors of the data that are not subject matter experts, it can be unclear what can be done with the structured data and how others typically analyze or use the data. For example, data scientists building machine learning (ML) models to analyze a given dataset may not be subject matter experts in the data itself, and may not have domain knowledge in how the data can (or should) be manipulated to improve ML results.

In an embodiment, a corpus of code relating to the same domain as the structured data can be mined to identify the expressions, and types of expressions, commonly employed to use and analyze the data. This can be done using static analysis, without actually executing the code expressions. In an embodiment, these mined code expressions can be used to build a recommendation engine. The recommendation engine can provide recommendations to accessors of the data (e.g., non subject matter experts) about what the accessor might want to do with the data. Further, in an embodiment, the mined code expressions can be applied to the data (e.g., automatically applied) and the expression can be evaluated for their value in analyzing the data.

One or more techniques described below can be used to mine expressions. For example, data flows between programs can be generated using knowledge graphs and other suitable techniques. This is discussed further in U.S. Patent Pub. No. 2021/0173641 (hereinafter the "Dolby Patent Publication"), which is hereby incorporated by reference for its discussion of generating data flows.

In an embodiment, reads from and writes to objects in the programs can then be tracked. For example, invocations in programs that are involved in reading structured data can return data objects (e.g., containers). Reads from and writes to these data objects can be tracked, and used to identify key insights to data manipulation. These reads and writes can further be summarized (e.g., by column and code operation) and used to generate the recommendation engine or to generate abstract lambda expressions to apply to the data.

In an embodiment, mined code expressions can then be correlated with characteristics of the data. For example, a given column in a dataset can be correlated with code expressions relating to that column, and a user can be provided with recommendations on potential expressions to use with that column. As discussed further below, column names (and other aspects of the structured data) can be normalized to improve the correlation.

In an embodiment, one or more of these techniques have significant advantages over prior solutions. For example, code expressions can be mined based on analyzing data flows of the code, without actually running the code. This is extremely valuable for numerous reasons. As one example, mining code expressions based on data flows, without running the code, saves significant computational resources. Many code expression repositories are very large, and actually running the code would be very computationally expensive, and effectively impossible in some circumstances. Mining the code expressions without running the code saves these resources and opens up larger code repositories as candidates for mining. Further, running the code could open up security concerns, either from inadvertent security flaws in the existing code expressions or from malicious code included in the existing code expressions. Mining the code expressions without running the code avoids these security concerns.

As another example, code expressions can be mined for a given dataset based on the structure of the dataset (e.g., characteristics of the dataset, including column and attribute names), without requiring the actual dataset. This also has numerous advantages. For example, the structure of many datasets is readily available, while the underlying data is not available (e.g., the owner of the data makes the structure available but not the data itself). One or more techniques described herein allow for mining of expression that access this data, without requiring access to the actual data. As another example, data may include personally identifying information (PII) or other sensitive information. Mining code expressions without accessing the underlying data avoids any privacy concerns or problems, because the actual sensitive data is not used or accessed.

FIG. 1 illustrates a computing environment 100 for mining code expressions for data analysis, according to one embodiment. In an embodiment, a data repository 110 includes structured data (e.g., data with labels for various aspects of the data). For example, the data repository 110 can include CSV files, JSON objects, or any other suitable structured data. In an embodiment, the data repository 110 includes dataset metadata 112. The dataset metadata 112 can describe the structure of the data, without including the actual underlying dataset values. For example, the dataset metadata 112 can include names for characteristics of the dataset, including names for attributes, names for columns or rows, or any other suitable label or other structure, without including the underlying data.

In an embodiment, one or more users 102 seek to access the data repository 110 using a communication network 120. The communication network 120 can be any suitable communication network, including the Internet, a wide area network, a local area network, or a cellular network. The users 102 can access the communication network 120 through any suitable electronic or computing device, including a smartphone, a tablet, a laptop computer, a desktop computer, or any other suitable device. Further, the users 102 can access the communication network 120 using any suitable wired or wireless communication technique (e.g., an Ethernet connection, a WiFi connection, a cellular connection, or any other suitable network connection).

In an embodiment, the users 102 are not subject matter experts relating to the data stored in the repository 110. A controller 140 can include an expression mining service 142. The expression mining service 142 can facilitate generating one or more mined code expressions 150 (e.g., using a number of existing code expressions 130), and providing the mined code expressions 150 to the users 102. The controller 140 is discussed further, below, with regard to FIG. 2.

For example, the existing code expressions 130 can be a corpus of code expressions previously used with the data stored in the data repository 110. The existing code expressions 130 can be generated by other users (e.g., other than the users 102) and can include data access methods 132. The data access methods 132 can access the data in the data repository 110, and generate corresponding data objects 134 (e.g., containers). As one example, the existing code expression can be stored in a publicly available repository (e.g., a GitHub® open source repository, a Kaggle® ML code repository, or any other suitable repository). As another example, a large entity (e.g., a corporation, a university, a research cooperative, or any other suitable entity) may maintain existing code expressions 130. Users that are associated with the entity may be able to access the existing code expressions. These are merely examples.

In an embodiment, the expression mining service 142 can be a software service configured to identify the mined code expressions 150 from the existing code expressions 130. For example, the expression mining service 142 can compute data flows in the existing code expressions 130, identify data objects in the existing code expressions 130 (e.g., the data objects 134), find read and write nodes in the existing code expressions 130, and identify the mined code expressions 150. This is discussed further, below, with regard to FIGS. 3-6. The users 102 can then use the mined code expressions 150 to identify suitable code expressions to use when accessing the data repository 110.

Figure 2:
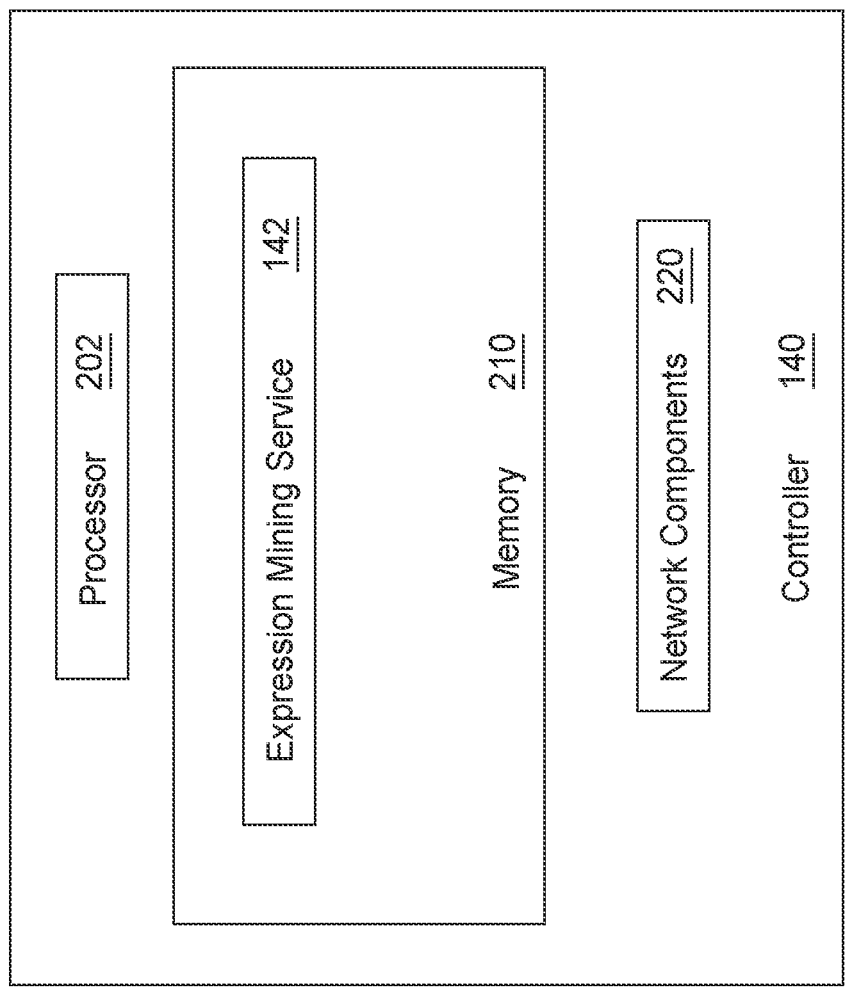
FIG. 2 is a block diagram of a controller for mining code expressions for data analysis, according to one embodiment.

FIG. 2 is a block diagram of a controller 140 for mining code expressions for data analysis, according to one embodiment. The controller 140 includes a processor 202, a memory 210, and network components 220. The memory 210 may take the form of any non-transitory computer-readable medium. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the controller 140 to interface with a suitable communication network (e.g., the communication network 120 interconnecting various components of the computing environment 100 illustrated in FIG. 1, or interconnecting the computing environment 100 with other computing systems). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the controller 140. The program code is generally described as various functional "applications" or "modules" within the memory 210, although alternate implementations may have different functions and/or combinations of functions. Within the memory 210, the expression mining service 142 facilitates identifying mined code expressions (e.g., the mined code expressions 150 illustrated in FIG. 1) from existing code expressions (e.g., the existing code expressions 130 illustrated in FIG. 1). This is discussed further, below, with regard to FIGS. 3-6.

While the controller 140 is illustrated as a single entity, in an embodiment, the various components can be implemented using any suitable combination of physical compute systems, cloud compute nodes and storage locations, or any other suitable implementation. For example, the controller 140 could be implemented using a server or cluster of servers. As another example, the controller 140 can be implemented using a combination of compute nodes and storage locations in a suitable cloud environment (e.g., as discussed further below). For example, one or more of the components of the controller 140 can be implemented using a public cloud, a private cloud, a hybrid cloud, or any other suitable implementation.

Although FIG. 2 depicts the expression mining service 142 as being located in the memory 210, that representation is also merely provided as an illustration for clarity. More generally, the controller 140 may include one or more computing platforms, such as computer servers for example, which may be co-located, or may form an interactively linked but distributed system, such as a cloud-based system, for instance. As a result, the processor 202, and the memory 210, may correspond to distributed processor and memory resources within the computing environment 100. Thus, it is to be understood that the expression mining service 142 may be stored at any suitable location within the distributed memory resources of the computing environment 100.

Figure 3:
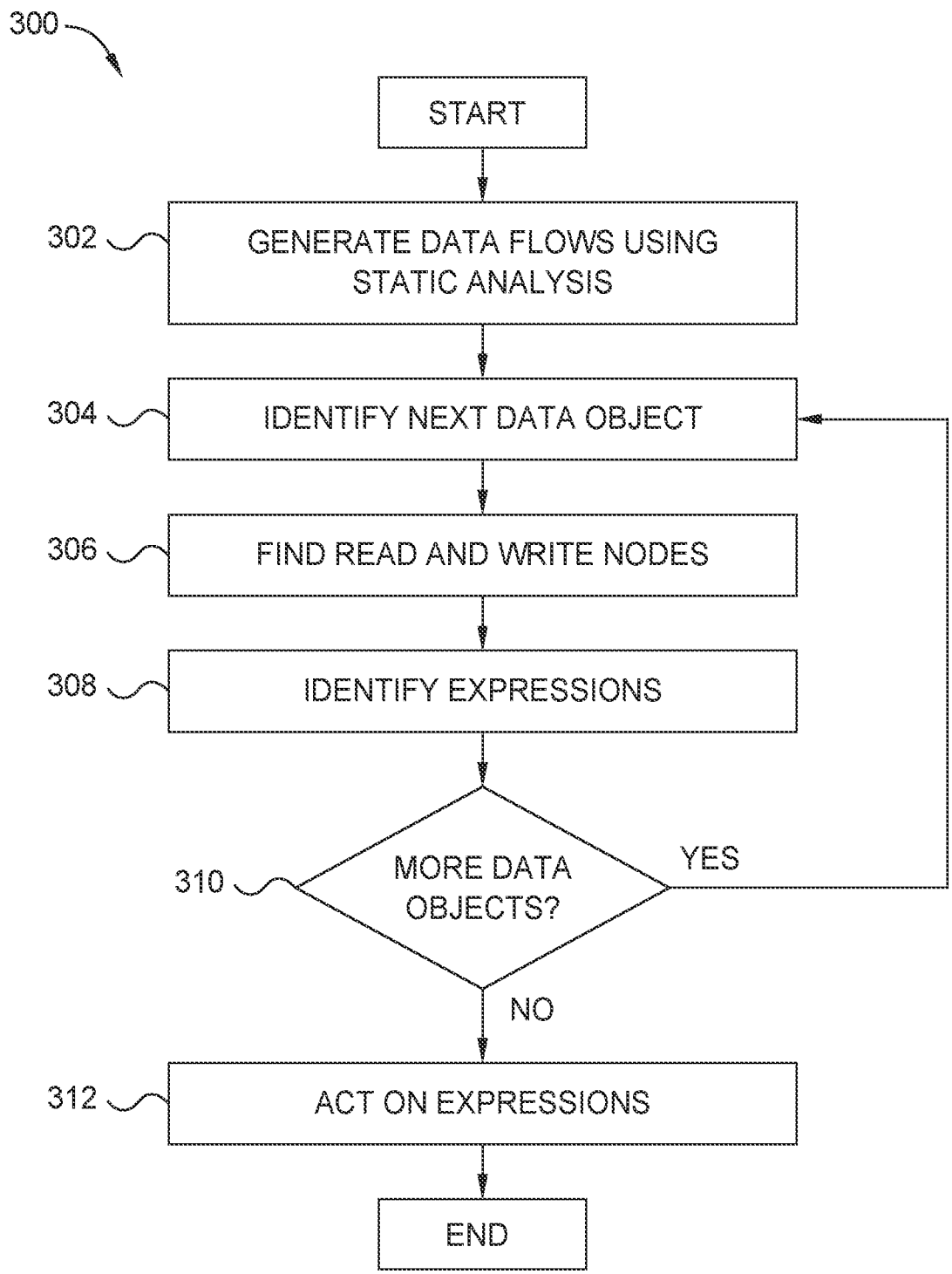
FIG. 3 is a flowchart illustrating mining code expressions for data analysis, according to one embodiment.

FIG. 3 is a flowchart 300 illustrating mining code expressions for data analysis, according to one embodiment. At block 302 an expression mining service (e.g., the expression mining service 142 illustrated in FIGS. 1-2) generates data flows using static analysis. For example, the expression mining service can access a repository of existing code expressions (e.g., the existing code expressions 130 illustrated in FIG. 1), and can generate data flows in the existing code expressions relating to a data repository (e.g., the data repository 110 illustrated in FIG. 1) using static analysis. The expression mining service analyzes the code expressions, but does not actually execute the code expressions.

For example, as noted above the Dolby Patent Publication is incorporated by reference for its discussion of generating data flows. The Dolby Patent Publication describes "building a knowledge graph using a lightweight, generic code abstraction of computer code form multiple applications." Dolby Patent Publication at ¶ [0001]. In an embodiment, the expression mining service uses one or more techniques described in the Dolby Patent Publication to generate a knowledge graph describing the data flows. For example, the knowledge graph can identify code methods being called, what those code methods are calling, and what arguments are being passed in the calls. An example of a knowledge graph is further described, below, with reference to FIG. 6.

At block 304, the expression mining service identifies a next data object (e.g., a next container). In an embodiment, method calls in code expressions that are involved in reading structured data return data objects. These data objects can be referred to as containers. For example, as illustrated in FIG. 1, the existing code expressions 130 include data access methods 132. These data access methods 132 read structured data (e.g., from the data repository 110) and return one or more data objects. These objects are the data objects 134. In an embodiment, any data object returned from a read of structured data can be a container. This is merely an example (e.g., using terminology from the Python® programming language), and any suitable terminology or technique can be used.

In an embodiment, the expression mining service identifies any object returned by a method accessing the structured data as a container, and selects the next container in this set of containers. Alternatively, the expression mining service identifies a subset of objects returned by methods accessing the structured data as containers, and selects the next container in this subset.

At block 306, the expression mining service finds read and write nodes. For example, the expression mining service can track reads from, and writes to, the identified data object (e.g., the container). The expression mining service can first gather all reads from the identified data object. The expression mining service can then find descendants of the read nodes that lead to write nodes. The expression mining service can further gather expressions for these write nodes. This is discussed further, below, with regard to FIG. 4.

At block 308, the expression mining service identifies expressions. For example, the expression mining service can normalize expressions by call path. The expression mining service can further normalize the expressions using type inference. The expression mining service then groups common expressions by operator. This is discussed further, below, with regard to FIG. 5.

At block 310 the expression mining service determines whether more data objects remain. If so, the flow returns to block 304 and the expression mining service identifies the next data object. If not, the flow proceeds to block 312.

At block 312 the expression mining service acts on the expressions. In an embodiment, the expression mining service can create lambda expressions. For example, a lambda expression can be a block of software code that takes a parameter (e.g., relating to the data being analyzed) and returns a value (e.g., relating to analyzing the data). In an embodiment, the expression mining service can generate one or more lambda expressions using the expressions mined using the techniques described above in relation to blocks 302-310.

Further, in an embodiment, the expression mining service can automatically apply the lambda expressions to the data. For example, as discussed above the expression mining service can generate one or more expressions that receive data as an input and generate an output by analyzing the data. The expression mining service can automatically apply these expressions to the data, to generate the outputs.

The expression mining service can also, in an embodiment, evaluate the value of an expression for a dataset (e.g., for building an ML model using the dataset). For example, one or more of the expressions identified at block 308 may have value in training (and using) an ML model. The expression mining service can use automated machine learning (AutoML) to identify the value of the expression to building an ML model. For example, the expression mining service can apply a given expression, and include the output from the expression in a dataset used for AutoML. The expression mining service can further evaluate the success of the AutoML with, and without, the expression, and can use that to evaluate the value of the relevant expression to building an ML model.

Alternatively, or in addition, the expression mining service can act as a recommendation engine for code expressions for users. The expression mining service can use a suitable user interface (e.g., a graphical or textual user interface) to present the expressions identified at block 308 to the user. The user can then select expressions to use or include (e.g., in additional projects).

In an embodiment, the expression mining service correlates identified expression with attributes of the dat. For example, the expression mining service can correlate a given characteristic (e.g., a column) in a dataset can with code expressions relating to that characteristic, and a user can be provided with recommendations on potential expressions to use with that characteristic (e.g., with that column). In this example, characteristic names (e.g., column names) can be normalized using a variety of techniques. For example, one or more techniques described in Semantic Concept Annotation for Tabular Data by Udayan Khurana and Sainyam Galhotra, Proceedings of the 30th ACM International Conference on Information & Knowledge Management Association for Computing Machinery 844-853 (2021) or Exploring Big Data with Helix: Finding Needles in a Big Haystack by Jason Ellis, Achille Fokoue, Oktie Hassanzadeh, Anastasios Kementsietsidis, Kavitha Srinivas, and Michael J. Ward, SIGMOD Rec. vol. 43, issue 4, at 43-54 (December 2014) can be used. These papers are hereby incorporated by reference for their discussion of normalizing structured data.

Figure 4:
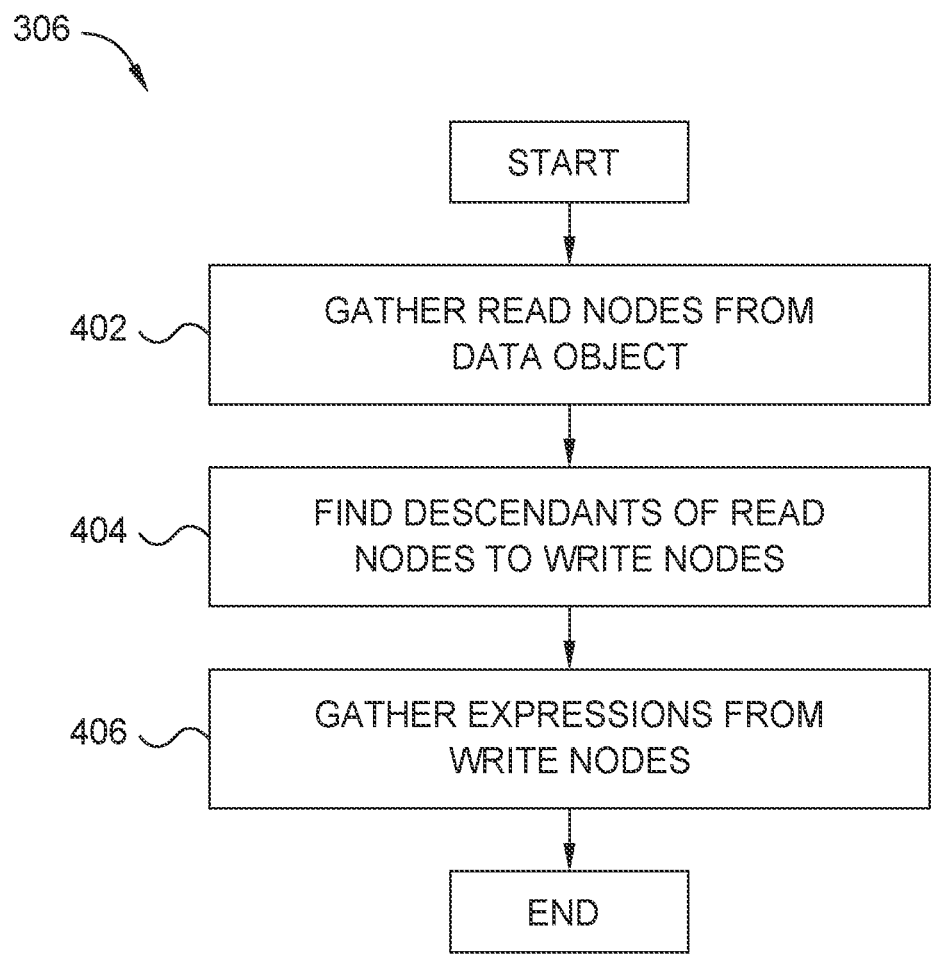
FIG. 4 is a flowchart illustrating finding read and write nodes for mining code expressions for data analysis, according to one embodiment.

FIG. 4 is a flowchart illustrating finding read and write nodes for mining code expressions for data analysis, according to one embodiment. In an embodiment, FIG. 4 corresponds with block 306 illustrated in FIG. 3. At block 402, an expression mining service (e.g., the expression mining service 142 illustrated in FIGS. 1-2) gathers read nodes from a data object (e.g., a container).

Figure 6:
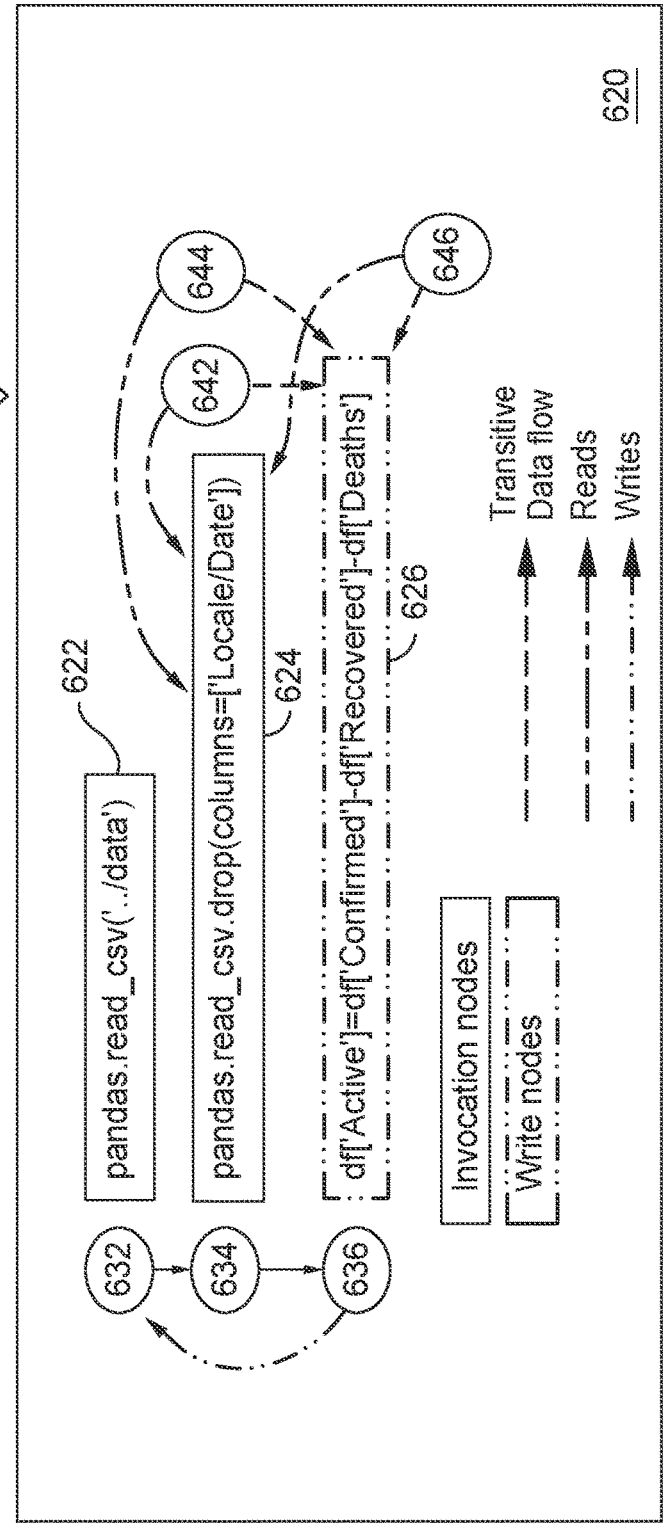
FIG. 6 illustrates an example of mining code expressions for data analysis, according to one embodiment.

As discussed above, a container is an example of a data object returned by an expression call (e.g., a read call). In an embodiment, the expression mining service uses a data flow describing a code expression to gather read nodes from a given container. For example, as discussed above, one or more techniques described in the Dolby Patent Publication can be used to generate a knowledge graph describing data flows for a code expression. This knowledge graph can be used to gather read nodes for a container. FIG. 6, described further below, provides an example of gathering read nodes (e.g., the read nodes 642, 644, and 646) from a container (e.g., the container 634).

At block 404, the expression mining service finds descendants from read nodes to write nodes. For example, a knowledge graph generated from a code expression can describe a descendent from a read node to a write node. The expression mining service identifies these descendants from read nodes to write nodes. This is also described further, below, with regard to the example of FIG. 6 (e.g., as illustrated in FIG. 6 the read nodes 642, 644, and 646 each have descendants to the write node 626). In an embodiment, the expression mining service identifies all descendants from any read node to any write node. Alternatively, the expression mining service identifies a subset of descendants from a read node to a write node.

At block 406, the expression mining service gathers expressions from write nodes. For example, the write nodes identified at block 404 are each associated with one or more expressions (e.g., write expressions). The expression mining service gathers these write expressions from the write nodes. This is also described further, below, with regard to the example of FIG. 6 (e.g., the write expression associated with the write node 626).

Figure 5:
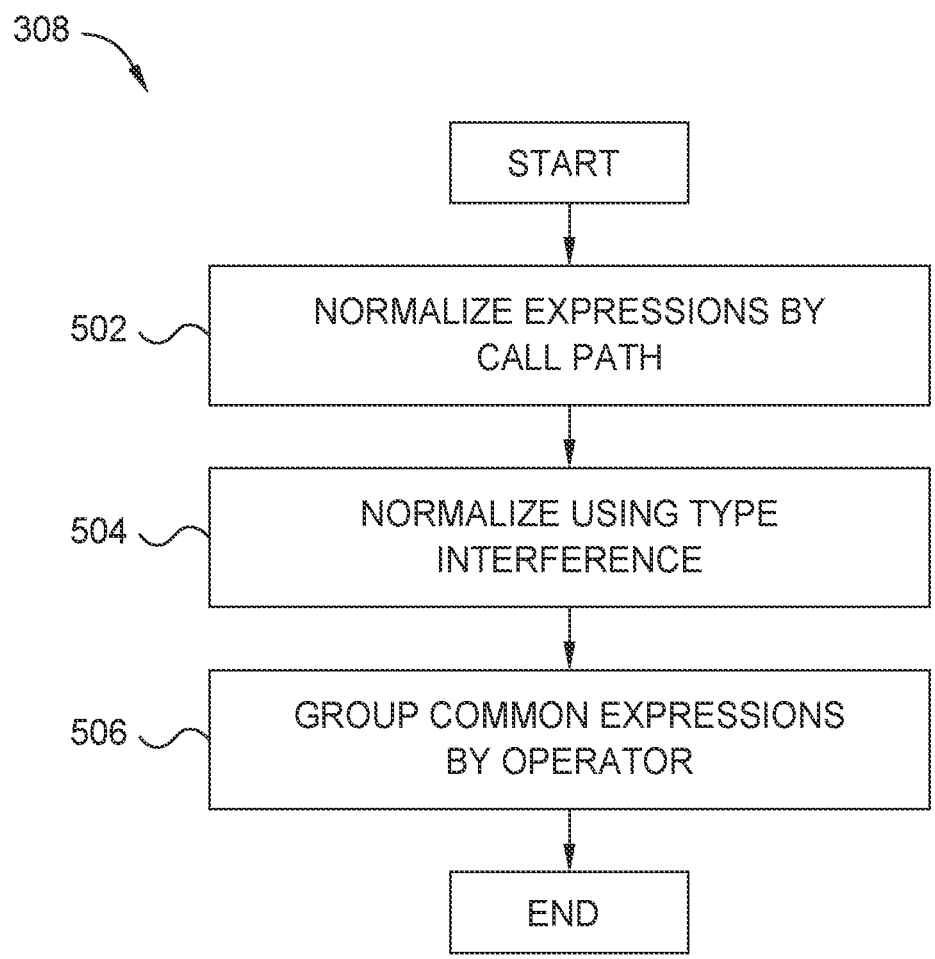
FIG. 5 is a flowchart illustrating identifying expressions for mining code expressions for data analysis, according to one embodiment.

FIG. 5 is a flowchart illustrating identifying expressions for mining code expressions for data analysis, according to one embodiment. In an embodiment, FIG. 5 corresponds with block 308 illustrated in FIG. 3. At block 502, an expression mining service (e.g., the expression mining service 142 illustrated in FIGS. 1-2) normalizes expression by call path.

As discussed above, in an embodiment the expression mining service identifies expressions based on calls to the dataset (e.g., based on which column the expression accesses). In an embodiment, expressions can use a variety of variable names to describe accessing the same data characteristic. This is because the programmer writing the code expression can use his or her own preferred naming scheme. In an embodiment, the expression mining service normalizes expressions by call path (e.g., to alleviate discrepancies in naming conventions).

At block 504, the expression mining service normalizes using type inference. In addition to the call path, described above in relation to block 502, the expression mining service can use type inference (e.g., variable types used in the code expression) to further normalize expressions. This can further alleviate discrepancies in naming conventions.

At block 506, the expression mining service groups common expressions by operator. In an embodiment, expressions that use a common operator on a given dataset (e.g., a common mathematical operator) can be grouped. These expressions grouped by operator can be presented to users as recommendations, and the users can select desired expressions based on the recommendations.

FIG. 6 illustrates an example 600 of mining code expressions for data analysis, according to one embodiment. In an embodiment, FIG. 6 provides an example of mining code expressions using one or more of the techniques described above in relation to FIGS. 3-5. This is merely one example, and other data and techniques can be used.

In an embodiment, a dataset 602 is being analyzed. For example, the dataset 602 can reflect medical data (e.g., disease data) which is available for analysis by a user (e.g., the user 102 illustrated in FIG. 1). This data can be stored in a suitable data repository (e.g., the data repository 110 illustrated in FIG. 1).

In an embodiment, an expression mining service (e.g., the expression mining service 142 illustrated in FIGS. 1-2) identifies a number of existing code expressions 610. For example, these existing code expressions 610 may have been created by others when analyzing the dataset 602. The existing code expressions 610 include a number of expressions used to analyze a given data set, and can also be stored in a suitable repository (e.g., the existing code expressions 130 illustrated in FIG. 1).

In an embodiment, the expression mining service generates a knowledge graph 620 describing data flows in the existing code expressions 610. For example, as described above, the expression mining service can use one or more techniques described in the Dolby Patent Publication to generate a knowledge graph with invocation nodes 622 and 624 (e.g., nodes corresponding to method calls), write node 626, and read nodes 642, 644, and 646. In an embodiment, the node 622 describes a "read_csv" expression on data located at the path "../data". The return value from this node 622 is a container 632. The node 624 describes a "read_csv-.drop" expression on the columns that match "Locale" or "Data" (e.g., an expression to drop columns with the labels "Locale" or "Data" from the DataFrame variable "df"). The return value from this node 624 is a container 634. The node 626 describes an expression in which df['Active'] (e.g., the DataFrame variable "df" at the index "Active") is set to the value of df['Confirmed']−df['Recovered']−df['Deaths']. The return value from this node 626 is a container 636.

In an embodiment, the expression mining service uses the knowledge graph 620 to mine the expression. For example, the expression mining service identifies one or more containers in the existing code expressions 610. As discussed, the expression mining service identifies three containers: a container 632 corresponding to the return value from the node 622, a container 634 corresponding to the return value from the node 624, and a container 636 corresponding to the return value from the node 626.

In an embodiment, the expression mining service then gathers reads from each container. Using the container 634 as an example, the expression mining service identifies three reads at the container, and identifies three read nodes 642, 644, and 646. The read node 642 corresponds to a read of the field 'Confirmed' from the container 634. The read node 644 corresponds to a read of the field 'Recovered' from the container 634. The read node 646 corresponds to a read of the field 'Deaths' from the container 634.

As illustrated, the expression mining service then finds all descendants from the read nodes 642, 644, and 646 to any write node. For example, the expression mining service identifies descendants from the read nodes 642, 644, and 646 to the write node 626. The expression mining service further gathers expressions from the write nodes. As illustrated, the expression mining service gathers the expression df['Active']=[df['Confirmed']-df['Recovered']-df['Deaths'] from the node 626. In an embodiment, this expression writes to the field 'Active' in the container 632 based on the values of 'Confirmed,' 'Recovered,' and 'Deaths' read from the container 634.

In an embodiment, the expression mining service then normalizes expressions by call path. As discussed above, in an embodiment an expression can include variables named by the drafter of the expression. The expression mining service can use the knowledge graph information to normalize variable names in the expression to account for differences among programmer name conventions. For example, the expression mining service can normalize the expression df['Confirmed] to pandas.read_csv_drop.Confirmed (e.g., using the knowledge graph 620 illustrated in FIG. 6). The expression mining service can further normalize the expression using type inference. For example, the variable "df" can correspond to variable of the Pandas DataFrame type in Python® (e.g., a two dimensional data structure). The expression mining service can normalize by this type. Further, the expression mining service can group common expressions across different programs by operator (e.g., the minus operator in the expression illustrated in the node 626).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
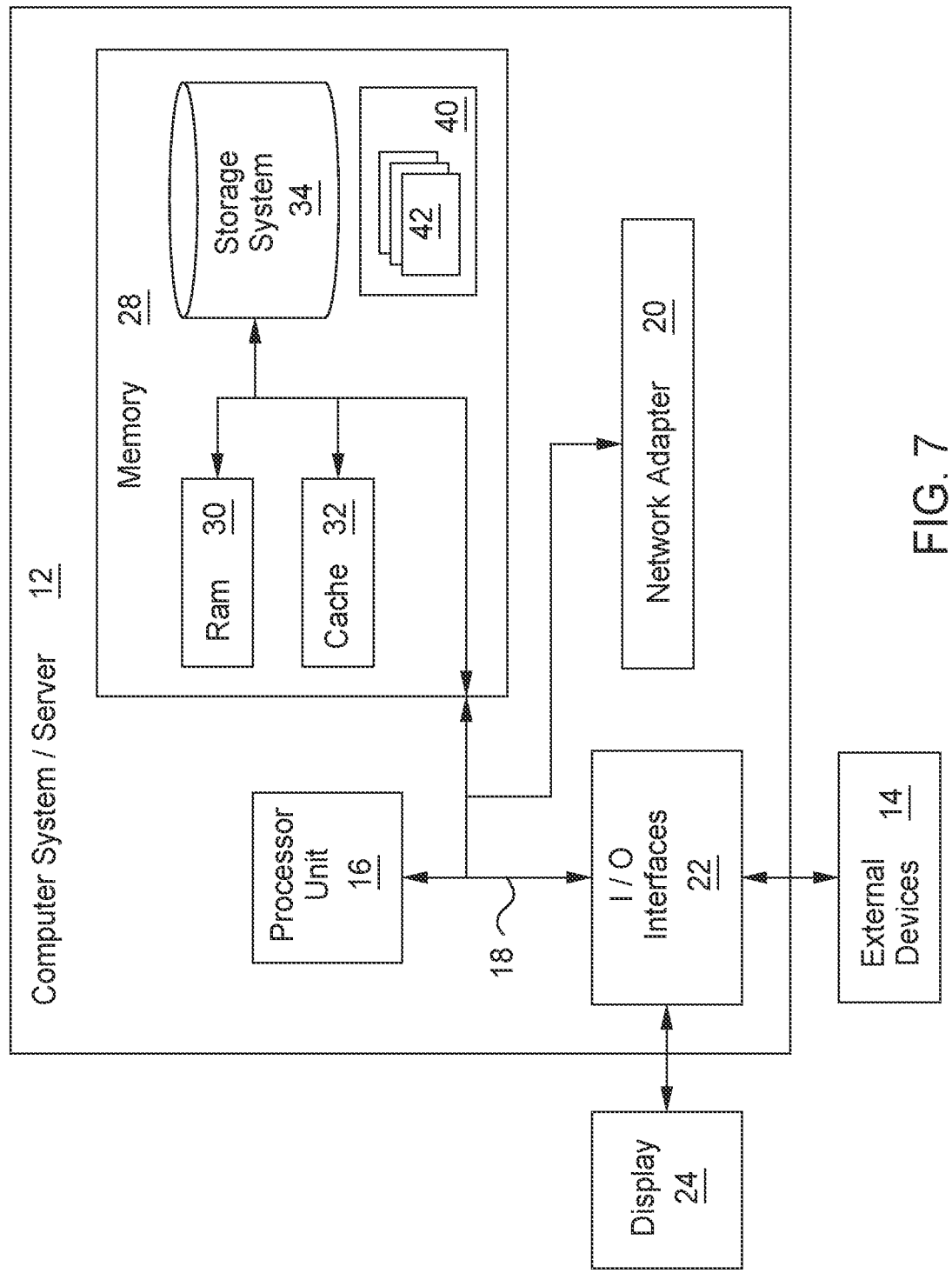
FIG. 7 illustrates a cloud computing node, according to one embodiment.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
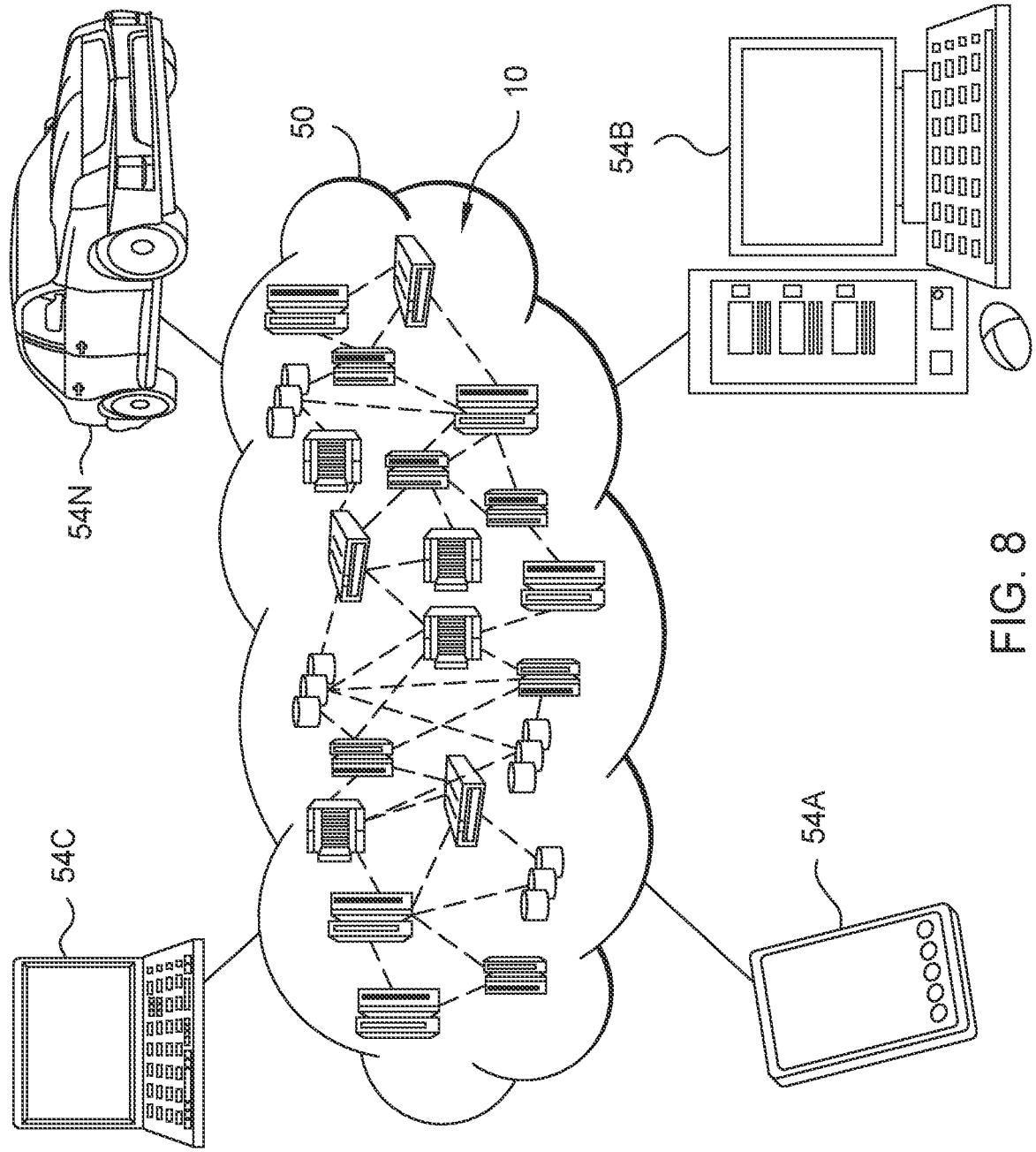
FIG. 8 illustrates a cloud computing environment, according to one embodiment.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
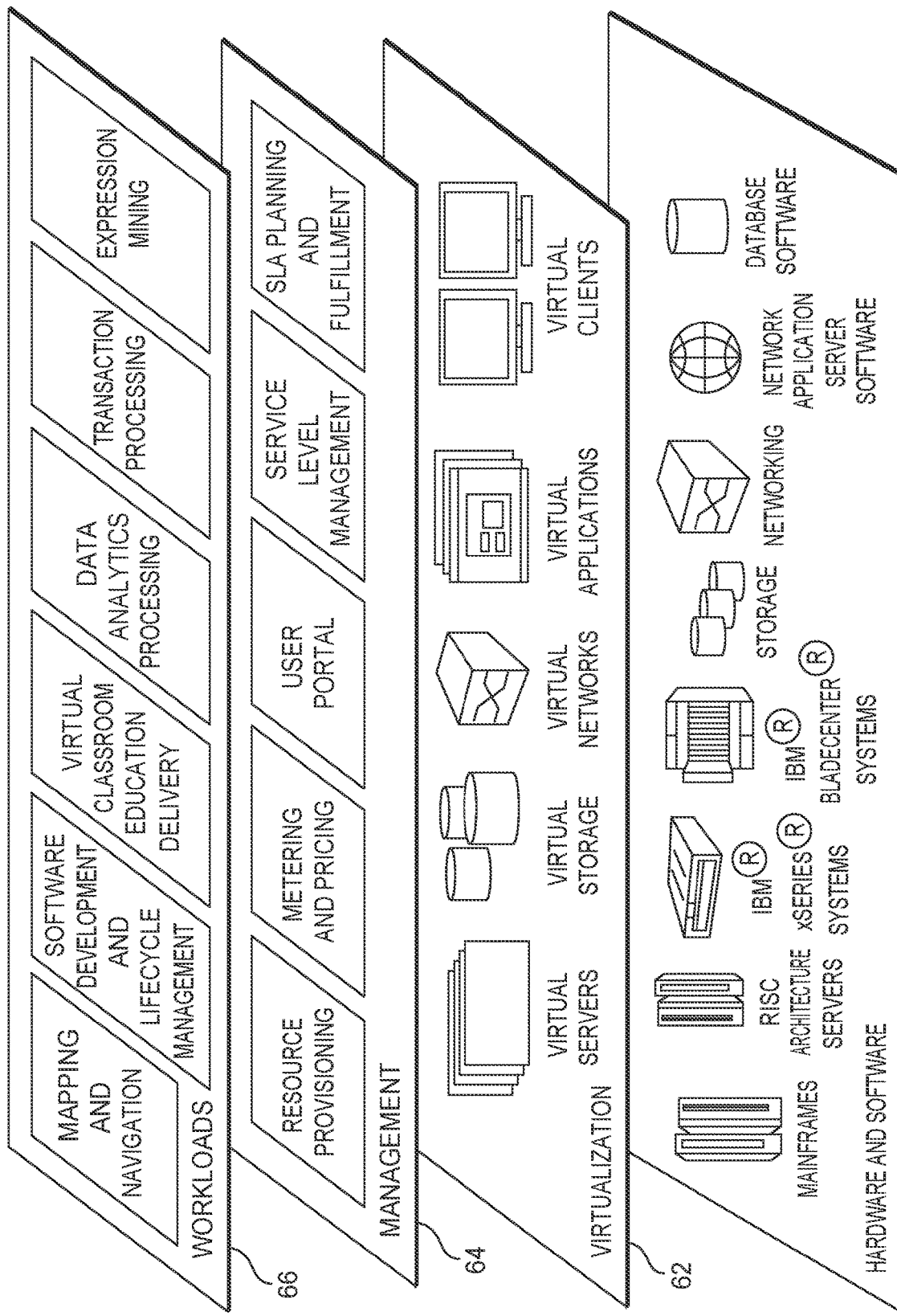
FIG. 9 illustrates abstraction model layers, according to one embodiment.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and expression mining. For example, the workloads layer 66 can implement some, or all, of the functionality of the expression mining service 142 illustrated in FIGS. 1-2, above.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
generating one or more data flows based on analyzing software code using static analysis;
identifying a data object in the software code using the one or more data flows, the data object relating to a structured dataset;
determining a correspondence between a code expression in the software code and a characteristic of the structured dataset, based on analyzing one or more reads from and one or more writes to the data object using the one or more data flows; and
analyzing the code expression for the structured dataset, based on the correspondence, comprising:
generating one or more lambda expressions for application to the structured dataset, based on the code expression; and
applying the one or more lambda expressions to the structured dataset, comprising:
executing lambda expression software code that takes at least a portion of the structured dataset as an input parameter and generates an output, wherein the lambda expression software code is executed and the code expression for the structured dataset is not executed.

2. The method of claim 1, wherein determining the correspondence between the code expression in the software code and the characteristic of the structured dataset, based on analyzing the one or more reads from and one or more writes to the data object using the one or more data flows further comprises:
  identifying the one or more reads from the data object, based on the one or more data flows; and
  identifying one or more writes relating to the one or more reads from the data object, based on the one or more data flows.

3. The method of claim 2, wherein determining the correspondence between the code expression in the software code and the characteristic of the structured dataset, based on analyzing the one or more reads from and one or more writes to the data object using the one or more data flows further comprises:
  normalizing the code expression based on the one or more data flows.

4. The method of claim 3, wherein normalizing the code expression based on the one or more data flows is based on at least one of: (i) a call path relating to the one or more data flows or (ii) type inference relating to the one or more data flows.

5. The method of claim 1, wherein analyzing the code expression for the structured dataset further comprises generating a software code recommendation engine based on the code expression and the structured dataset.

6. The method of claim 5, wherein the software code recommendation engine correlates the code expression and a column name relating to the structured dataset.

7. The method of claim 5, wherein generating the software code recommendation engine comprises grouping a plurality of computations relating to the code expression based on an operation relating to each of the plurality of computations.

8. The method of claim 1, wherein analyzing the code expression for the structured dataset further comprises:
  determining a value for the code expression based on evaluating the one or more lambda expressions using automated machine learning (AutoML).

9. The method of claim 1, wherein the structured dataset comprises at least one of a comma-separated-value (CSV) file or a javascript object notation (JSON) data structure.

10. A system, comprising:
  a processor; and
  a memory having instructions stored thereon which, when executed on the processor, performs operations comprising:
    generating one or more data flows based on analyzing software code using static analysis;
    identifying a data object in the software code using the one or more data flows, the data object relating to a structured dataset;
    determining a correspondence between a code expression in the software code and a characteristic of the structured dataset, based on analyzing one or more reads from and one or more writes to the data object using the one or more data flows; and
    analyzing the code expression for the structured dataset, based on the correspondence, comprising:
      generating one or more lambda expressions for application to the structured dataset, based on the code expression; and
      applying the one or more lambda expressions to the structured dataset, comprising:
        executing lambda expression software code that takes at least a portion of the structured dataset as an input parameter and generates an output, wherein the lambda expression software code is executed and the code expression for the structured dataset is not executed.

11. The system of claim 10, wherein determining the correspondence between the code expression in the software code and the characteristic of the structured dataset, based on analyzing the one or more reads from and one or more writes to the data object using the one or more data flows further comprises:
  identifying the one or more reads from the data object, based on the one or more data flows; and
  identifying one or more writes relating to the one or more reads from the data object, based on the one or more data flows.

12. The system of claim 11, wherein determining the correspondence between the code expression in the software code and the characteristic of the structured dataset, based on analyzing the one or more reads from and one or more writes to the data object using the one or more data flows further comprises:
  normalizing the code expression based on the one or more data flows.

13. The system of claim 10, wherein analyzing the code expression for the structured dataset further comprises generating a software code recommendation engine based on the code expression and the structured dataset, and
  wherein the software code recommendation engine correlates the code expression and a column name relating to the structured dataset.

14. A computer program product comprising:
  a computer-readable storage medium having computer-readable program code embodied therewith, the computer-readable program code executable by one or more computer processors to perform operations, comprising:
    generating one or more data flows based on analyzing software code using static analysis;
    identifying a data object in the software code using the one or more data flows, the data object relating to a structured dataset;
    determining a correspondence between a code expression in the software code and a characteristic of the structured dataset, based on analyzing one or more reads from and one or more writes to the data object using the one or more data flows; and
    analyzing the code expression for the structured dataset, based on the correspondence, comprising:
      generating one or more lambda expressions for application to the structured dataset, based on the code expression; and
      applying the one or more lambda expressions to the structured dataset, comprising:
        executing lambda expression software code that takes at least a portion of the structured dataset as an input parameter and generates an output, wherein the lambda expression software code is executed and the code expression for the structured dataset is not executed.

15. The computer program product of claim 14, wherein determining the correspondence between the code expression in the software code and the characteristic of the structured dataset, based on analyzing the one or more reads from and one or more writes to the data object using the one or more data flows further comprises:

identifying the one or more reads from the data object, based on the one or more data flows; and identifying one or more writes relating to the one or more reads from the data object, based on the one or more data flows.

16. The computer program product of claim 15, wherein determining the correspondence between the code expression in the software code and the characteristic of the structured dataset, based on analyzing the one or more reads from and one or more writes to the data object using the one or more data flows further comprises:

normalizing the code expression based on the one or more data flows.

17. The computer program product of claim 14, wherein analyzing the code expression for the structured dataset further comprises generating a software code recommendation engine based on the code expression and the structured dataset, and wherein the software code recommendation engine correlates the code expression and a column name relating to the structured dataset.

* * * * *